(12) United States Patent
Karagiannis et al.

(10) Patent No.: US 10,389,524 B2
(45) Date of Patent: Aug. 20, 2019

(54) INTRODUCING MIDDLEBOXES INTO SECURE COMMUNICATIONS BETWEEN A CLIENT AND A SERVER

(71) Applicant: Microsoft Technology Licensing, LLC, Redmond, WA (US)

(72) Inventors: Thomas Karagiannis, Cambridge (GB); Christos Gkantsidis, Cambridge (GB); David Naylor, Pittsburgh, PA (US); Richard Li, Salt Lake City, UT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 15/640,160

(22) Filed: Jun. 30, 2017

(65) Prior Publication Data
US 2018/0375644 A1  Dec. 27, 2018

(30) Foreign Application Priority Data

Jun. 26, 2017 (GB) .................................. 1710168.4

(51) Int. Cl.
*H04L 9/32* (2006.01)
*H04L 9/08* (2006.01)
(Continued)

(52) U.S. Cl.
CPC .......... *H04L 9/083* (2013.01); *H04L 63/0281* (2013.01); *H04L 63/0464* (2013.01);
(Continued)

(58) Field of Classification Search
CPC ................. H04L 29/0809; H04L 9/083; H04L 2463/062; H04L 63/0281; H04L 63/0464;
(Continued)

(56) References Cited

U.S. PATENT DOCUMENTS 6,643,701 B1 * 11/2003 Aziz ...................... G06F 21/33
 705/64
7,992,200 B2  8/2011 Kuehr-McLaren et al.
(Continued)

FOREIGN PATENT DOCUMENTS

EP  3113443 A1  1/2017

OTHER PUBLICATIONS

"Intel Software Guard Extensions Remote Attestation End-to-End Example", Retrieved From: https://software.intel.com/en-us/articles/intel-software-guard-extensions-remote-attestation-end-to-end-example, Jul. 8, 2016, 12 Pages.
(Continued)

*Primary Examiner* — Gary S Gracia (57) ABSTRACT

A method of communicating over a network between first and second endpoints, one being and the other being a server. The method comprises: establishing a first secure transport layer channel between the first and second endpoints, establishing a second secure transport layer channel between the first endpoint and a middlebox to which the first endpoint is to delegate processing of the traffic sent over the first secure transport layer channel; the first endpoint validating the middlebox via the respective second secure transport layer channel, and on condition of said validation sharing the encryption key of the first channel with the middlebox via the second secure transport layer channel; and causing the traffic sent over the channel to be routed via the middlebox. The method thereby enables the middlebox to process, in the clear, content of the traffic sent over the first channel.

20 Claims, 4 Drawing Sheets

(51) Int. Cl.
  *H04L 29/06* (2006.01)
  *G06F 21/00* (2013.01)
  *H04L 29/08* (2006.01)
(52) U.S. Cl.
  CPC ........ *H04L 9/0822* (2013.01); *H04L 29/0809* (2013.01); *H04L 63/105* (2013.01); *H04L 63/166* (2013.01); *H04L 63/205* (2013.01); *H04L 2463/062* (2013.01)
(58) Field of Classification Search
  CPC ... H04L 63/105; H04L 63/166; H04L 63/205; H04L 9/0822
  See application file for complete search history.

(56) References Cited

U.S. PATENT DOCUMENTS

| | | | | |
|---|---|---|---|---|
| 9,374,344 | B1* | 6/2016 | Takahashi | H04L 63/0428 |
| 2004/0103277 | A1 | 5/2004 | Seada et al. | |
| 2007/0038853 | A1* | 2/2007 | Day | H04L 63/0281 |
| | | | | 713/153 |
| 2009/0271612 | A1 | 10/2009 | Liu | |
| 2011/0154019 | A1* | 6/2011 | Wang | H04L 63/0281 |
| | | | | 713/153 |
| 2012/0233453 | A1* | 9/2012 | Lev Ran | H04L 63/0428 |
| | | | | 713/150 |
| 2016/0323278 | A1* | 11/2016 | Yang | H04L 63/0884 |
| 2017/0093984 | A1* | 3/2017 | Dhanabalan | H04L 67/141 |
| 2017/0223053 | A1* | 8/2017 | Dhanabalan | H04L 63/166 |
| 2017/0331800 | A1* | 11/2017 | Wood | G06F 9/442 |

OTHER PUBLICATIONS

"International Search Report and Written Opinion Issued in PCT Application No. PCT/US18/035771", dated Aug. 23, 2018, 13 Pages.

Kucuk, et al., "Exploring the use of Intel SGX for Secure Many-Party Applications", In Proceedings of the 1st Workshop on System Software for Trusted Execution, Dec. 12, 2016, 6 pages.

"Cloud-assisted Security Services (CloSer)", https://wiki.aalto.fi/download/attachments/97621003/CloSer.pdf?version=1&moditicationDate=1475743294247&api=v2, Retrieved on: Mar. 30, 2017, pp. 1-16.

Koponen, et al., "Resilient Connections for SSH and TLS", In Proceedings of Annual Technical Conference Technical Program, May 30, 2006, 16 pages.

Hurel, et al., "Towards Cloud-Based Compositions of Security Functions for Mobile Devices", In Proceedings of IFIP/IEEE International Symposium on Integrated Network Management, May 11, 2015, 10 pages.

Yuan, et al., "Privacy-preserving deep packet inspection in outsourced middleboxes", In Proceedings of 35th Annual IEEE International Conference on Computer Communications, Apr. 10, 2016, 9 pages.

"ARM TrustZone", https://www.arm.com/products/security-on-arm/trustzone, Retrieved on: Apr. 13, 2017, 6 pages.

"Aryaka", http://www.aryaka.com/, Retrieved on: Apr. 13, 2017, 8 pages.

"Brocade", http://www.brocade.com/en/products-services/software-networking/network-functions-virtualization.html, Retrieved on: Apr. 13, 2017, 4 pages.

"Curl", https://curl.haxx.se/, Mar. 2017, 2 pages.

"Our Edge Network is how we connect with ISPs to get traffic to and from users", https://peering.google.com/#/, Retrieved on: Apr. 13, 2017, 3 pages.

"Architecture for Technology Transformation", In White Paper of Juniper networks, Retrieved on: Apr. 13, 2017, 11 pages.

"mbTLS", https://mbtls.org/, Retrieved on: Apr. 13, 2017, 1 pages.

"Network Functions Virtualization", http://www.dell.com/en-us/work/learn/tme-telecommunications-solutions-telecom-nfv, Retrieved on: Apr. 13, 2017, 9 pages.

"Telefonica", http://www.tid.es/long-term-innovation/networkinnovation/telefonica-nfv-reference-lab, Retrieved on: Apr. 13, 2017, 5 pages.

"Zscaler", https://www.zscaler.com/, Retrieved on: Apr. 13, 2017, 9 pages.

"AT&T Vision Alignment Challenge Technology Survey", In AT&T Domain 2.0 Vision White Paper, Nov. 13, 2013, pp. 1-22.

Anati, et al., "Innovative technology for CPU based attestation and sealing", In Proceedings of the 2nd international workshop on hardware and architectural support for security and privacy, vol. 13, Jun. 2013, pp. 1-7.

Arnautov, et al., "SCONE: Secure Linux Containers with Intel SGX", In Proceedings of the 12th USENIX conference on Operating Systems Design and Implementation, Nov. 2, 2016, pp. 689-703.

Zylva, Ash De, "Windows 10 Device Guard and Credential Guard Demystified", https://blogs.technet.microsoft.com/ash/2016/03/02/windows-10-device-guard-and-credential-guard-demystified/, Mar. 2, 2016, 10 pages.

Baumann, et al., "Shielding Applications from an Untrusted Cloud with Haven", In Journal of ACM Transactions on Computer Systems, vol. 33, Issue 3, Sep. 2015, 26 pages.

Dierks, et al., "The Transport Layer Security (TLS) Protocol Version 1.2", https://www.bibsonomy.org/bibtex/2240ea6b7a1e6424b78a7d579d5e98882/neoatnhng, Aug. 2008, 2 pages.

Durumeric, et al., "The Security Impact of HTTPS Interception", In Proceedings of Network and Distributed Systems Symposium, Feb. 26, 2017, pp. 1-14.

Fayazbakhsh, et al., "Enforcing Network-Wide Policies in the Presence of Dynamic Middlebox Actions using FlowTags", In Proceedings of the 11th USENIX Symposium on Networked Systems Design and Implementation, Apr. 2, 2014, pp. 533-546.

Gember-Jacobson, et al., "OpenNF: Enabling innovation in network function control", In Proceedings of the ACM conference on SIGCOMM, Aug. 17, 2014, 12 Pages.

Hoekstra, et al., "Using innovative instructions to create trustworthy software solutions", In Proceedings of the 2nd International Workshop on Hardware and Architectural Support for Security and Privacy, Jun. 23, 2013, pp. 1-8.

Huang, et al., "Analyzing Forged SSL Certificates in the Wild", In Proceedings of the IEEE Symposium on Security and Privacy, May 18, 2014, 15 pages.

Kim, et al., "A first step towards leveraging commodity trusted execution environments for network applications", In Proceedings of the 14th ACM Workshop on Hot Topics in Networks, Nov. 16, 2015, 7 pages.

Lan, et al., "Embark: Securely outsourcing middleboxes to the cloud", In Proceedings of 13th USENIX Symposium on Networked Systems Design and Implementation, Mar. 16, 2016, pp. 255-273.

Lepeska, Peter, "Trusted proxy and the cost of bits", In Proceedings of 90th IETF meeting, Jul. 2014, 9 pages.

Liang, et al., "When HTTPS Meets CDN: A Case of Authentication in Delegated Service", In Proceedings of IEEE Symposium on Security and Privacy, May 18, 2014, pp. 67-82.

Loreto, et al., "Explicit Trusted Proxy in HTTP/2.0-draft-loreto-httpbis-trusted-proxy20-01", https://tools.ietf.org/html/draft-loreto-httpbis-trusted-proxy20-01, Feb. 14, 2014, 20 pages.

Martins, et al., "ClickOS and the Art of Network Function Virtualization", In Proceedings of the 11th USENIX Conference on Networked Systems Design and Implementation, Apr. 2, 2014, pp. 459-473.

McGrew, et al., "TLS Proxy Server Extension", https://tools.ietf.org/html/draft-mcgrew-tls-proxy-server-01, Published on: Jul. 16, 2012, 18 pages.

McKeen, et al., "Innovative instructions and software model for isolated execution", In Proceedings of the 2nd International Workshop on Hardware and Architectural Support for Security and Privacy, Jun. 23, 2013, pp. 1-8.

(56) References Cited

OTHER PUBLICATIONS

Naylor, et al., "The Cost of the "S" in HTTPS", In Proceedings of the 10th ACM International on Conference on emerging Networking Experiments and Technologies, Dec. 2, 2014, 8 pages.

Naylor, et al., "Multi-Context TLS (mcTLS): Enabling Secure In-Network Functionality in TLS", In Proceedings of the ACM Conference on Special Interest Group on Data Communication, Aug. 17, 2015, pp. 199-212.

O'Neill, et al., "TLS Proxies: Friend or Foe?", In Proceedings of the Internet Measurement Conference, Nov. 14, 2016, 7 pages.

R. Peon, "Explicit Proxies for HTTP/2.0", https://tools.ietf.org/html/draft-rpeon-httpbis-exproxy-00, Published on: Jun. 8, 2012, 12 pages.

E. Rescorla, "The Transport Layer Security (TLS) Protocol Version 1.3", https://tools.ietf.org/html/draft-ietf-tls13-07, Jul. 8, 2015, pp. 1-98.

Sherry, et al., "Making middleboxes someone else's problem: Network processing as a cloud service", In Proceedings of the ACM SIGCOMM conference on Applications, technologies, architectures, and protocols for computer communication, Aug. 13, 2012, 12 pages.

Sherry, et al., "Blindbox: Deep packet inspection over encrypted Traffic", In Proceedings of the ACM Conference on Special Interest Group on Data Communication, Aug. 17, 2015, 22 pages.

Sullivan, Nick, "Keyless SSL: The Nitty Gritty Technical Details", https://blog.cloudflare.com/keyless-ssl-the-nitty-gritty-technical-details/,Published on: Sep. 19, 2014, 33 pages.

Xu, et al., "Investigating transparent web proxies in cellular networks", In Proceedings of International Conference on Passive and Active Network Measurement, Mar. 19, 2015, pp. 1-8.

\* cited by examiner

INTRODUCING MIDDLEBOXES INTO SECURE COMMUNICATIONS BETWEEN A CLIENT AND A SERVER

CROSS-REFERENCE TO RELATED APPLICATIONS

This application claims priority to GB application serial number 1710168.4, filed Jun. 26, 2017, the entirety of which is hereby incorporated by reference herein.

BACKGROUND

Internet communication no longer necessarily consists of two endpoints exchanging messages over a dumb packet-forwarding core. Rather, data is frequently processed by intermediary middleboxes like caches, compression proxies, intrusion detection systems, or virus scanners. For example, all four major U.S. mobile carriers use HTTP proxies and a typical enterprise network has roughly as many middleboxes as it does routers and switches. However, as the use of encryption online increases (as of 2014, nearly half of all Web flows used HTTPS), these middleboxes become "blind" to the content of the traffic and hence can no longer perform their jobs. This has prompted both the academic community and industry to consider the question: how do we integrate middleboxes into secure communication sessions?

Because TLS, the standard secure communication protocol used in the Internet, is designed for exactly two parties, the current practice is to split the connection into two separate TLS connections: the middlebox impersonates the server to the client and opens a second connection to the server. But doing so drastically weakens security, in part because the client cannot explicitly authenticate the middlebox and also cannot be sure that the middlebox properly authenticated the server. Recently, proposals like Multi-Context TLS (mcTLS) have addressed this by allowing endpoints to explicitly authenticate one another as well as the middlebox.

However, the picture is complicated by an emerging middlebox deployment model: outsourcing middlebox functionality to third parties such as ISPs or third party cloud providers who offer middleboxes-as-a-service. This promises the cost benefits of economy of scale and frees network administrators from configuring and managing multiple specialized boxes. But it also poses a new challenge: the owner of middlebox software (middlebox service provider) and the owner of the hardware it runs on (infrastructure provider) are not the same. If the infrastructure is untrusted, existing protocols like split TLS and mcTLS cannot provide the standard security properties TLS gives us today because, firstly, session data and keys are visible in memory, and secondly, the endpoints cannot tell if infrastructure provider actually ran the code the middlebox provider intended it to.

One known idea is to protect session data from infrastructure providers using new cryptographic techniques. Blind-Box and Embark have introduced new techniques that allow middleboxes to directly process encrypted data. These works are based on pattern matching the encrypted data without decrypting it.

SUMMARY

While attractive from a privacy perspective, these solutions only support middleboxes that perform pattern matching, like intrusion detection systems. They are still not able to access the actual (clear) content of the encrypted traffic. This means they are limited in what they can do. Firstly, they are point solutions, i.e. they can work only on specific instances of specific tasks. Secondly they cannot perform any tasks that require knowledge of the actual content. Needing to operate on the encrypted content also makes them very slow. Further, existing approaches require both endpoints to up upgraded, which is a significant barrier to deployment.

It would be desirable to provide a technique which enables a middle box to operate on the content of traffic, but at the same time still preserving security. Preferably, it would also be desirable to do this in a way that does not necessarily rely on both endpoints being upgraded, such that the technique will work even if one endpoint is upgraded to recognize the new protocol and the other endpoint is a legacy endpoint.

According to one aspect of the present disclosure, there is provided a method of communicating over a network between a first endpoint and a second endpoint, the first endpoint being a client device or a server and the second endpoint being the other of the client device and server. The method comprises establishing a first secure transport layer channel between the first and second endpoints, the first secure transport layer channel being defined by a first cryptographic key required to access content of traffic sent over the first secure transport layer channel. The method further comprises establishing a second secure transport layer channel between the first endpoint and a middlebox to which the first endpoint is to delegate processing of the traffic sent over the first secure transport layer channel, the second secure transport layer channel being defined by a second cryptographic key required to access content sent over the second secure transport layer channel. The first endpoint validates (e.g. authenticates) the middlebox via the respective second secure transport layer channel, and on condition of said validation shares the first encryption key with the middlebox via the second secure transport layer channel. Further, traffic sent over the channel is routed via the middlebox. The method thereby enables the middlebox to process, in the clear, content of the traffic sent over the first secure transport layer channel using the first cryptographic key Thus by validating (e.g. authenticating) its middlebox via a secondary (i.e. auxiliary) secure channel, the first endpoint can determine that the middlebox is trusted before introducing it into the first channel, i.e. the primary or main channel. The second endpoint trusts the first endpoint, and the first endpoint trusts the middlebox. Furthermore, since the handshaking required to introduce the middlebox into the primary channel is performed only between the first endpoint and its middlebox, the second endpoint does not necessarily have to know about the middlebox or be upgraded in any way to recognize a new protocol. From the perspective of the second endpoint, it appears simply that it is communicating with the first endpoint.

In embodiments, the disclosed protocol further protects session data from third party infrastructure providers by isolating the middlebox execution environment from the third party infrastructure in a so-called "enclave", i.e. an isolated execution environment that is not accessible to any other applications running on the third party's operating system. In embodiments this execution environment is also not accessible by the third party's operating system itself, nor by any hypervisor.

In further alternative or additional embodiments, the disclosed protocol provides other useful security properties which may be advantageous in multi-party settings. For example, in embodiments the disclosed protocol guarantees that data visits middleboxes in the order specified by the endpoints and prevents attackers from learning whether or not a middlebox modified a piece of data before forwarding it on.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how they may be put into effect, reference is made, by way of example only, to the accompanying drawings in which.

DETAILED DESCRIPTION OF EMBODIMENTS

As discussed, Internet communication today typically involves intermediary middleboxes like caches, compression proxies, or virus scanners. As encryption becomes more widespread, these middleboxes become blind and cannot provide their security, functionality, and performance benefits. Despite efforts in both industry and academia, there is presently no way to integrate middleboxes into secure sessions whilst retaining both the functionality of the middlebox and the security session.

The following presents a protocol to introduce one or more middleboxes into a secure channel, such as for use in a secure multi-party communication session. The protocol provides a set of security properties for sessions such as multi-party communication sessions. In embodiments the protocol still works even if one of the endpoints (client or server) is still a legacy endpoint that has not been upgraded to recognize the protocol. In embodiments the protocol uses an SGX enclave or the like to provide security guarantees on untrusted hardware. In embodiments the protocol further preserves the order in which the traffic passes through each middlebox if there are multiple middleboxes introduced in a chain.

The protocol advantageously resolves two otherwise competing requirements. On the one hand, Internet communication is no longer restricted to two endpoints exchanging messages over a dumb packet-forwarding core. Instead, data is frequently processed by intermediary middleboxes like caches, compression proxies, intrusion detection systems, or virus scanners. On the other hand however, as the use of encryption online increases, these middleboxes become blind and can no longer perform their jobs. It would be desirable to be able to retain the security of such encryption whilst at the same time allowing the use of middleboxes, including the possibility of third party middleboxes.

For instance, consider the increasing practice of outsourcing middlebox functionality to ISPs or to third party cloud providers who offer middleboxes as-a-service. This promises the cost benefits of economy of scale and frees network administrators from configuring and managing multiple specialized boxes. This setting however also poses a new challenge: the owner of middlebox software (middlebox service provider) and the owner of the hardware it runs on (infrastructure provider) are not the same. If the infrastructure is untrusted, existing protocols cannot provide the standard security properties TLS gives us today because (i) session data and keys are visible in memory and (ii) the endpoints cannot tell if infrastructure provider actually ran the code the middlebox provider intended it to.

Figure 1:
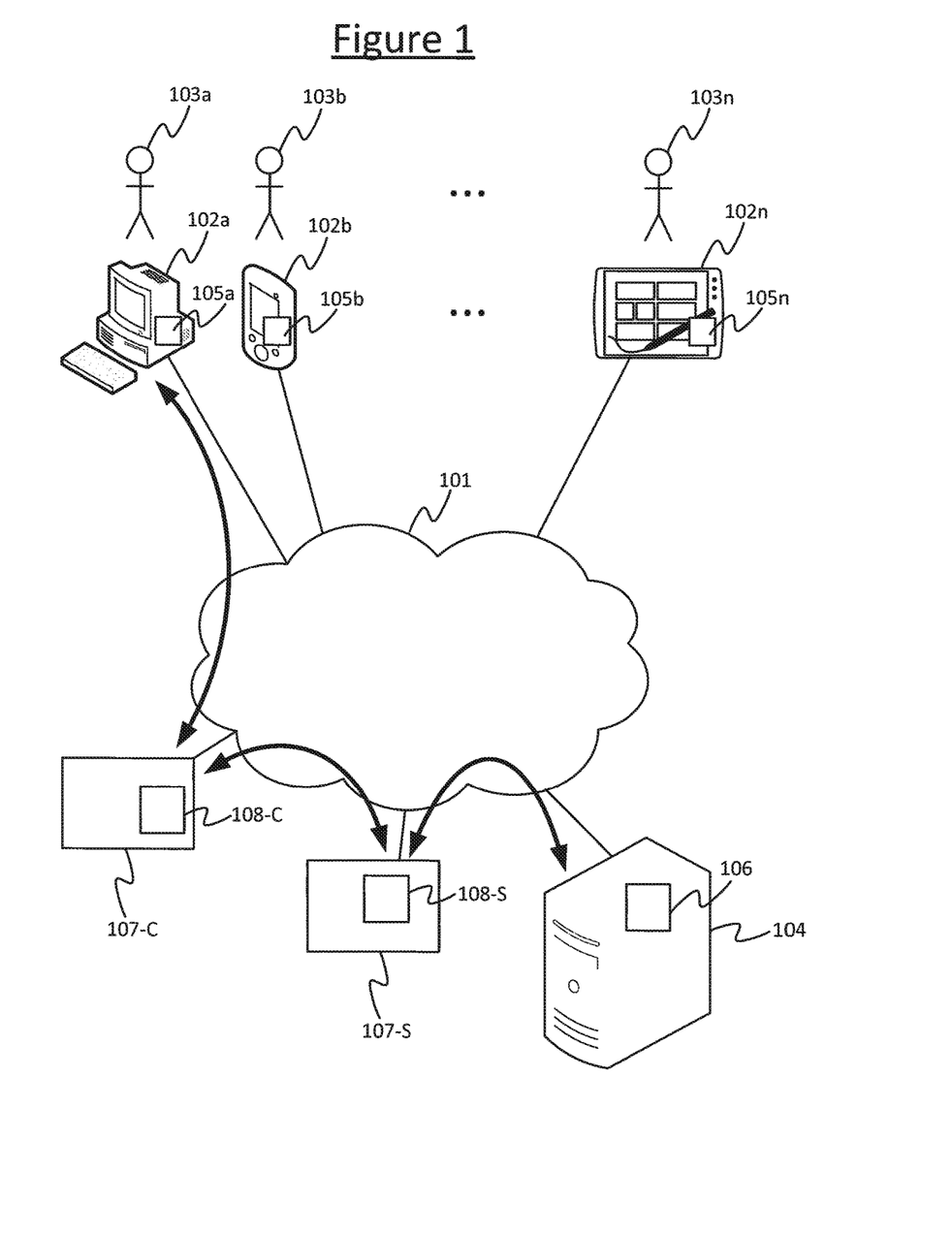
FIG. 1 is a schematic illustration of a communication system for communicating between a client and a server via one or more middleboxes.

FIG. 1 illustrates a networked computer system in accordance with embodiments of the present disclosure. The system comprises a packet-switched data network 101, preferably in the form of a wide-area internetwork such as that commonly referred to as the Internet. The system also comprises a plurality of client devices in the form of user terminals 102, each used by a respective user 103. Each user terminal 102 may take any of a variety of potential forms, for instance a static user terminal such as a desktop computer, or a mobile terminal such as a laptop, tablet, smartphone or wearable device (e.g. smartwatch or smart-glasses). Each user terminal 102 is configured to connect to the network 101 via a suitable wired or more often wireless access technology, e.g. via a local wireless router or access point of a wireless local area network (WLAN); or via a mobile cellular network such as a 3GPP network (e.g. 3G, LTE, 4G or 5G network); or via a local wired network such as an Ethernet network; or via a wired modem connecting to the network 101 via a PSTN or cable network. Various other means will be familiar to a person skilled in the art. Note also that the different user terminals need not necessarily take the same form as one another, and need not necessarily connect to the network 101 via the same means.

The system further comprises a server 104, which is also connected to the network 101. Note that a server as referred to herein refers to any server equipment which may comprise one or more physical server units located at one or more geographic sites. In the case of multiple units (a so-called "cloud" computing or cloud storage arrangement), suitable techniques for distributed storage and distributed computing will in themselves be familiar to a person skilled in the art. Also, again various suitable wired or wireless means for connecting the server unit(s) to the network 101, and one another in the case of a distributed system, will be known to a person skilled in the art (e.g. those discussed above or others).

By whatever means physically implemented, the server 104 is configured to host serving software 106. The serving software 106 takes the form of code stored on storage of the server 104 and arranged to run on a processing apparatus of the server 104. The serving software 106 is configured so as when run in this manner to provide a service to the client devices 102, and therefore their users 103, via the network 101. The service provided may take any of a variety of forms, e.g. a cloud storage service, a collaborative workspace service, VoIP or video conference service, etc. Whatever the application, the serving software 106 is further configured to perform server-side functions in accordance with any of the methods disclosed herein. Where operations are attributed herein to the server 104 herein, it will be understood that this is a shorthand referring to the operations performed by the serving software 106 running on the server 104.

The storage (memory) on which the serving software 106 is stored may take the form of one or more memory units implemented on one or more memory units implemented in any one or more server units, employing any suitable one or more memory media, e.g. a magnetic medium such as a hard drive, an electronic medium such as an EEPROM, flash memory or solid state drive (SSD), or even an optical medium. The processing apparatus of the server 104, upon which the serving software 106 is run, may comprise one or more single cored or multi core processing units implemented in any one or more server units. Such processing units may comprise for example CPUs and/or work-accelerator processors such as GPUs, etc. Various suitable physical processor means will in themselves be familiar to a person skilled in the art.

Each of the user terminals 102 is installed with a respective instance of a client application 105. The client application 105 takes the form of software stored on storage of the respective user terminal 102 and arranged to run on a processing apparatus of the respective user terminal 102. The client application 105 is configured so as, when thus run, to access the serving software 106 on the server 104 via the network 101 and any suitable wired or wireless network interface of the respective user terminal 102 (e.g. the network interface being configured to connect via any of the means discussed above). The client application 105 is further configured to perform client-side functions in accordance with any of the methods described herein. Where operations are attributed herein to the client device 102, or just the "client", it will be understood that this is a shorthand referring to the operations performed by the client application 105 running on the respective client device 102.

The storage (memory) on which each respective instance of the client application 105 is stored may take the form of one or more memory units of the respective user terminal 102, employing any suitable one or more memory media, e.g. a magnetic medium such as a hard drive, an electronic medium such as an EEPROM, flash memory or solid state drive (SSD), or an optical medium such as a CD ROM or DVD drive. The processing apparatus of the respective user terminal 102, upon which the respective instance of the client application 105 is run, may comprise one or more single cored or multi core processing units. Such processing units may again include CPUs and/or work-accelerator processors such as GPUs, etc. Again various suitable physical processor means will in themselves be familiar to a person skilled in the art.

Furthermore, the computer system comprises one or more middleboxes 108 running on one or more intermediate pieces of network equipment 107. A middlebox 108 is an entity to which the client or server defers some operation to be performed on the traffic other than just packet forwarding. This will typically include some operations that require access to the content of the traffic—i.e. the clear (decrypted) payload. Such middleboxes 108 may include for example any one or more of: a virus scanner, a child safety filters (e.g. parental control filter), an intrusion detector, a compression proxy, an audio and/or video transcoder, an HTTP proxy, an application-layer load balancer, and/or a cache.

The middleboxes 108 may include one or more client middleboxes 108-C to which the client 102 defers one or more operations, and/or one or more server middleboxes 108-S to which the server 104 defers one or more operations.

Each middlebox 108 takes the form of software stored in storage means of its respective network equipment 107 and arranged to run on processing apparatus of the respective network equipment. Again the storage used may comprise one or more physical storage units at one or more geographic locations and may employ one or more storage media (e.g. a magnetic medium such as a hard drive, or an electronic medium such as an EEPROM, flash memory or SSD, etc.). The processing apparatus may again comprise one or more single cored or multi core processing units, e.g. CPUs and/or work-accelerator processors, etc. Also, again various suitable wired or wireless means for connecting the middlebox equipment 108 to the network 101 will be known to a person skilled in the art (e.g. those discussed above or others). Again various suitable physical storage, processor and network interface means will in themselves be familiar to a person skilled in the art. The middleboxes 108 may be implemented in separate physical units to one another or in the same physical unit. The middlebox equipment 108 may be external to bother the client device 102 and the server 104, or could even be implemented in the same physical equipment as the server 104.

Whatever form the physical implementation takes, the client 102 is configured to establish a secure transport layer channel 201 with the server 104 over the network 101 via one or more middleboxes 108-C, 108-S. This channel 201 may include one or more middleboxes of the client 102, introduced into the channel 201 by the client 102; and/or one or more middleboxes 108 of the server 104, introduced into the channel by the server 204. The establishment of the channel is initiated by the client 102.

Preferably the secure transport layer channel 201 takes the form of a TLS channel established using the TLS (Transport Layer Security) protocol. Embodiments below will be described in terms of TLS channels, but is not excluded that the methods disclosed herein would be implemented using other types of secure transport layer protocol, e.g. a legacy protocol such as SSL (Secure Socket Layer) or a future variant of TLS or the like which the skilled person may devise using his/her skill in the art.

The transport layer is the layer of the OSI model above the packet layer, e.g. above the IP layer in IP (Internet Protocol) based networks such as the Internet. The channel is "secure" in that the content of traffic sent over the channel is encrypted (using known cryptographic techniques which in themselves will be familiar to a person skilled in the art). A secure transport layer channel is defined, at least in part, by a cryptographic key which is required to decrypt the traffic sent over the channel. Where it is said that a middlebox 108 is introduced into the TLS channel 201, this means it is given the key of the relevant channel and that traffic sent over that channel is routed via the middlebox 108 in question.

Figure 2A:
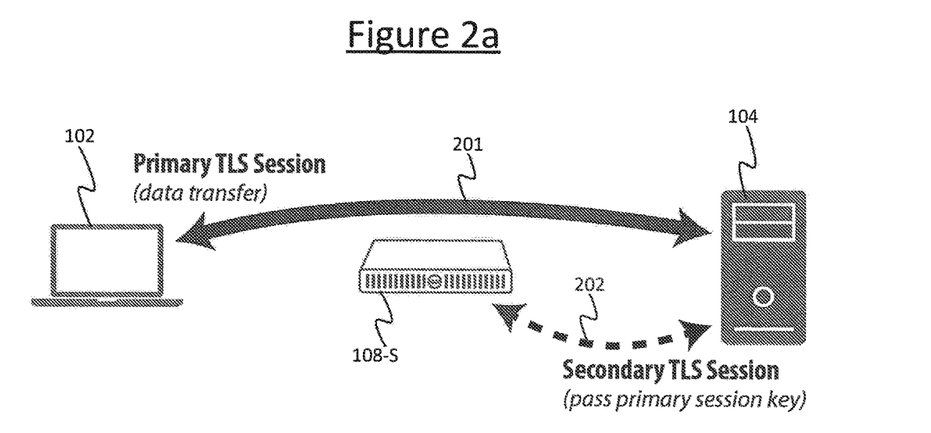
FIG. 2a is a schematic illustration of method of including a middlebox in a channel established between a client and a server.

As illustrated in FIG. 2a, this is achieved by means of a secondary secure transport layer channel 202, preferably also a TLS channel, established between middlebox 108 and the endpoint (client 102 or server 104) to which that middlebox belongs. Say for the sake of discussion that the middlebox 108 in question is a middlebox of the server 104, i.e. a middlebox 108-S to which the server 104 delegates some operation to be performed upon the traffic between the client 102 and server 104 (though the same process can alternatively or additionally be used mutatis mutandis in order for the client 102 to introduce a middlebox 108-C of the client 102).

According to the protocol disclosed herein, the server 104 establishes a secondary (i.e. auxiliary) TLS channel 202 with its middlebox 108-S via the network 101. It then uses this channel to validate the middlebox. Preferably this comprises at least verifying that the middlebox 108-S being contacted is provided by the intended party (e.g. intended third party). In embodiments this verification comprises performing an authentication over the second TLS channel 202 to authenticate that the party providing the middlebox is a trusted party. This may employ any of a variety of possible authentication techniques which in themselves are known in the art. Further, in embodiments the validation performed via the second TLS channel 202 may alternatively or additionally comprise verifying that the middlebox 108-S being contacted provides the desired service. E.g. if the server requires a virus scanning service, the server 104 verifies that the middlebox 108-S in question comprises a virus scanner, and that it is a specific virus scanner. In embodiments this comprises verifying the binary that initialized the enclave, which implies a specific virus scanner of a specific version.

Once this verification is complete, and on condition of a positive verification, the server 104 then shares the cryptographic security key for the primary (main) TLS channel 201 with the middlebox 108-S over the secondary TLS channel 202.

From the beginning, the server 104 advertises its IP address or domain name to the client 102 as that of the server's middlebox 108-S, such that when the client 102 sends messages establishing the primary TLS channel 201 and then subsequently sends traffic over the primary TLS channel 201, all these messages and traffic are routed to the server 104 via the middlebox 108-S, with the middlebox 108-S being set up to forward them to the server 104. An alternative is to configure routing protocols and/or forwarding mechanisms in the network 101 to forward traffic destined for the server 104 to the middlebox 108-S. Messages and traffic sent back from the server 104 to the client 102 are also routed via the middlebox 108-S. Further, once it has the address and key, the middlebox 108-C can then access the actual (decrypted) content of any traffic passing via the middlebox 108-S. This enables it to perform its function as a middlebox, e.g. a virus scanner or parental filter.

Because the client 102 trusts the server 104 (having authenticated it via the primary TLS channel 201), and the server 104 trusts the middlebox 108-S, then in effect it can be considered as if the client 102 it trusts the server's middlebox 108-S—even though the client 102 does not in fact necessarily need to know it is communicating via the middlebox 108-S of operate any differently than if it was establishing a conventional TLS channel directly with a server 104. This latter point means that the server 104 can be upgraded with the new protocol whilst the client 102 can, in embodiments, still be a legacy client.

If the client 102 is not a legacy client, the same process may be used mutatis mutandis in relation to the client 102 and its middlebox 108-C. I.e. the client 102 establishes a respective secondary TLS channel (different from that established by the server 104 if both use middleboxes), and uses this to validate the respective middlebox 108-C. It then uses this channel to share the encryption key of the primary channel. The client 102 also advertises its IP address or domain name to the server 104 as being that of the client's middlebox 108-C, or else the routing protocols and/or forwarding mechanisms in the network 101 are configured to forward traffic destined for the client 102 to its middlebox 108-C. Thus traffic is sent via the client's middlebox 108-C is made accessible (in the clear) to that middlebox 108-C, enabling it to perform its middlebox function on behalf of the client 102. In embodiments the server 104 does not need to be upgraded to recognize the new protocol and can instead be a legacy server 104. Alternatively both the client 102 and server 104 may use their own respective middlebox 108-C, 108-S, in which case each performs a separate instance of the protocol via a different respective secondary TLS channel 202.

Figure 4:
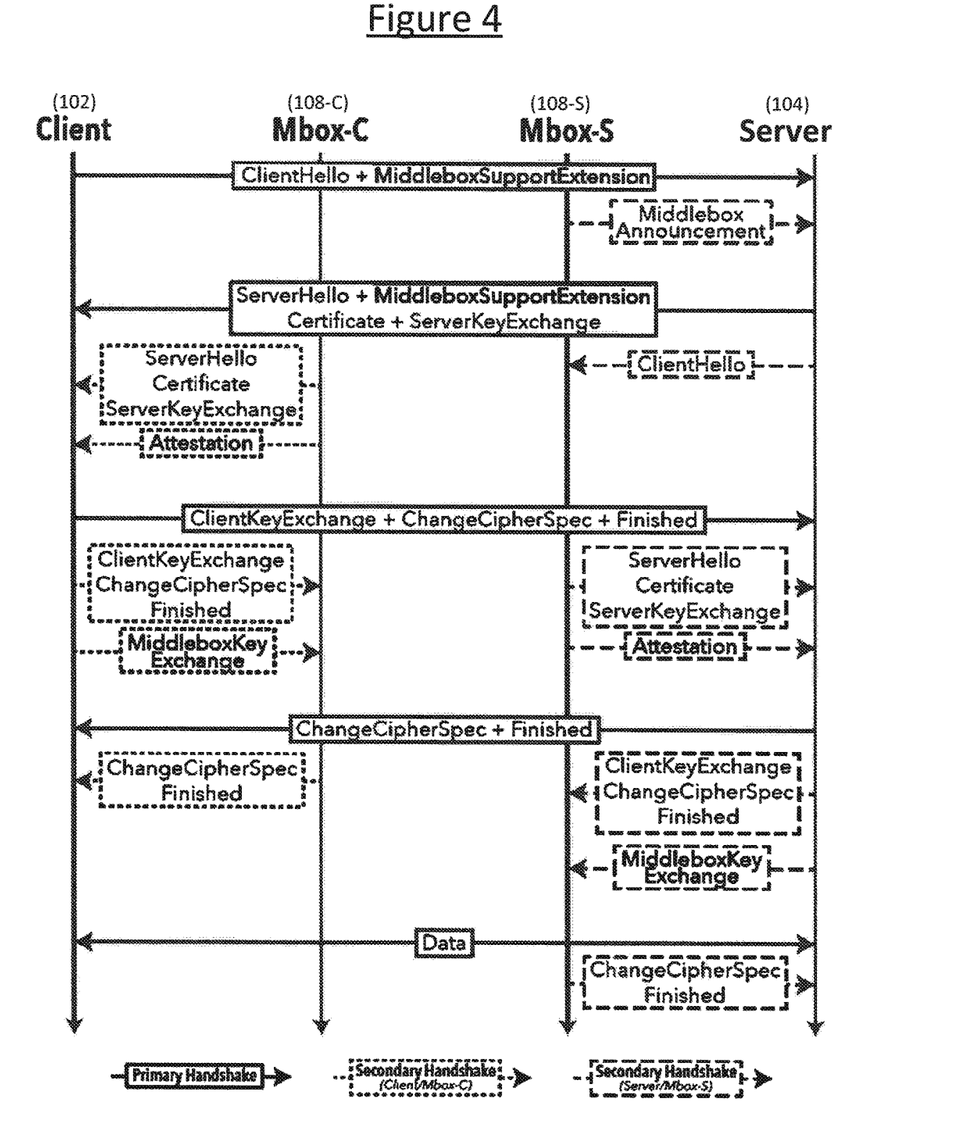
FIG. 4 is a schematic signalling chart illustrating a method of establishing a secure TLS channel and introducing a middlebox into the channel.

An example implementation of the protocol is shown in more detail in FIG. 4, to be discussed in more detail shortly. The steps illustrated with a solid line represent steps of the primary handshake whereby the 102 client establishes the primary secure transport layer channel with the server 104. The steps illustrated with dotted lines represent the steps of the secondary handshake on the client side, whereby the client 102 establishes the respective secondary secure channel with its middlebox 108-C, validates this middlebox 108-C via this secondary channel, and then shares the security key for the primary channel 201 with the respective middlebox 108-C via the respective secondary channel. The steps illustrated with dashed lines represent the steps of the secondary handshake on the server side, whereby the server 104 establishes the respective secondary secure channel with its middlebox 108-S, validates this middlebox 108-S via this secondary channel, and then shares the security key for the primary channel 201 with the respective middlebox 108-S via the respective secondary channel.

For a client-side middlebox 108-C, when the client 102 sends a standard TLS message requesting to initiate the primary TLS channel, it includes in it a new type of TLS Extension announcing its support of middleboxes. This message is sent to the server 104 via the middlebox 108-C. The extension triggers the middlebox 108-C to begin the handshake to establish the secondary TLS channel with the client 102. For a server-side middlebox in the case when a legacy client does not include the new TLS extension, the server middlebox 108-S autonomously sends a new type of (non-standard) TLS message announcing itself to the server 104, and this begins the handshake to establish the secondary TLS channel with the server 104.

Once the primary channel 201 is established and any required middleboxes 108 are successfully introduced, the primary TLS channel 201 can be used for any application desired by the programmer. For instance, the primary TLS channel 201 may be used to conduct a multipart communication session including the client 102 (e.g. client 102a in FIG. 1) and one or more further clients 102b . . . 102n all communicating with one another via the server 104 and primary TLS channel 201. E.g. the session may comprise a multiparty VoIP call, video call, or other media session such as a remote slideshow presentation, screen sharing session or virtual whiteboard.

Figure 2B:
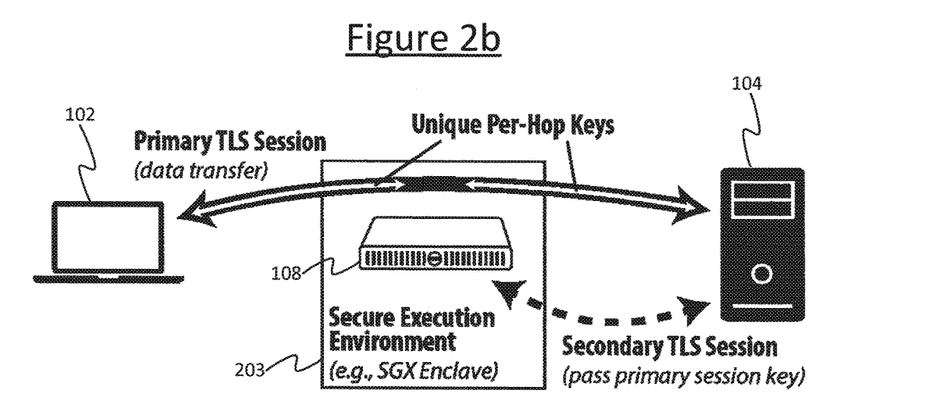
FIG. 2b is a schematic illustration of a further method of communicating via a middlebox.

As illustrated in FIG. 2b, in embodiments the (or each) middlebox 108 is preferably run in a secure "enclave" on its respective network equipment 108. This is a secure virtual environment in which the middlebox 108, and the data which it receives over the secure TLS channels 201, 202, are isolated from other applications running on the operating system of the same network equipment 107. I.e. no other application can access this data even if running on the same physical equipment. Examples of suitable secure enclaves include SGX (Software Guard eXtensions), TrustZone, SEV (Secure Encrypted Virtualization) and others. In cases such as SGX, the operating system itself also blocked from accessing the data in the enclave, as is any hypervisor.

Figure 3:
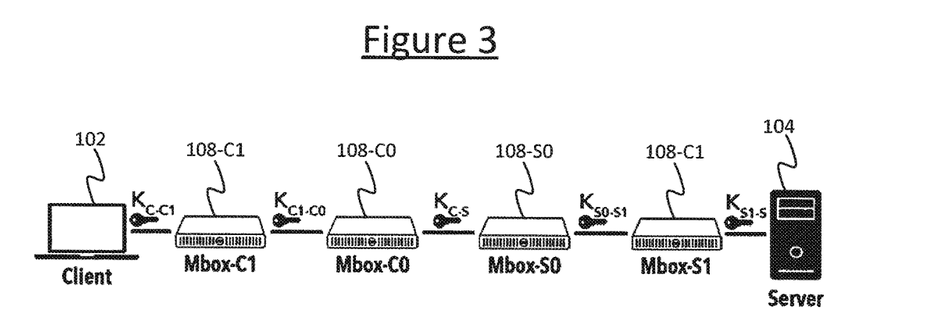
FIG. 3 is a schematic illustration of a technique for preserving middlebox order in a communication via multiple middleboxes.

As shown in FIG. 3, in further alternative or additional embodiments, a chain of multiple middleboxes 108 may be introduced into the primary TLS channel 201, including one or more of the client 102 and one or more of the server 104 (such that one or both of the client 102 and server could have a respective plurality of middleboxes 108). In the case of multiple client-side middleboxes 108-C, the client 102 establishes a different respective secondary TLS channel with each in order to introduce the respective middlebox 108-C into the primary TLS channel, each in accordance with the process described above. Similarly, in the case of multiple server-side middleboxes 108-S, the server 104 establishes a different respective secondary TLS channel with each of the server-side middleboxes 108-S into the primary TLS channel, again each in accordance with the process described above.

The client 102 forwards messages and traffic to the first (closest) client-side middlebox 108-C in the chain, and that middlebox forwards them to the next client-side middlebox 108-C in the chain, and so forth. The farthest client-side middlebox 108-C forwards the messages and traffic to the server-side middlebox 108-S farthest from the server 104, which forwards them to the next server-side middlebox 108-S in the chain, and so forth, until the server-side's immediate (closest) middlebox 108-S forwards to the server 104. N.B. "closest" and "farthest" herein mean in terms of number of hops, not necessarily physical distance. When sending traffic and messages from the server 104 to the client 102, the process works in the same way but in the opposite direction.

Furthermore, in accordance with particular embodiments disclosed herein, a technique is applied to ensure middlebox order when traffic is sent over the primary TLS channel 201 between the client 102 and the server 104. When the traffic is routed along the immediate hop between the client 102 and its immediate (closest) client-side middlebox 108-C1, this is encrypted using a first client-side encryption key K_C-C1. When traffic is routed along the next hop between this client-side middlebox 108-C1 and the client-side middlebox 108-C0 next farthest from the client 102, it is encrypted with a different, second client-side encryption key K_C1-C0, and so forth. When the traffic is routed along the immediate hop between the server 104 and its immediate (closest) server-side middlebox 108-S1, this is encrypted using a first server-side encryption key K_S1-S. When traffic is routed along the next farthest hop between this server-side middlebox 108-S1 and the server-side middlebox 108-S0 next farthest from the server 104, it is encrypted with a different, second client-side encryption key K_S0-S1, and so forth. Note that these encryption keys are different than those of the secondary TLS channels used to verify the middleboxes 108 and share with them the key of the primary TLS channel.

Between the client-side middlebox 108-C farthest from the client 102 and the server-side middlebox 108-S farthest from the server, the traffic is exchanged using the primary encryption key K_C-S of the primary TLS channel. Note: it is assumed here that the client side and server side middleboxes 108-C, 108-S do not mix with each other, e.g. a server side middlebox 108-S cannot be closer to the client than any client-side middlebox 108-C. The way this is achieved is the following: the middleboxes 108 observe traffic from other middleboxes 108, and if they see traffic from a middlebox of different type (e.g. client middlebox 108-C sees server middlebox traffic), then they disable themselves.

Thus traffic over each hop is encrypted with a different respective unique encryption key. I.e. the receiving middlebox 108 at each hop decrypts with the key setup for the previous hop, and then re-encrypts using the new key next immediate hop so that the next middlebox can decrypt. This ensures the middleboxes have to each process the traffic in the desired order in the chain, otherwise they would not be able to decrypt the content of the traffic. Also, another benefit is that any malicious third party eavesdropping on the traffic cannot tell even whether or not any given middlebox 108 in the chain has modified the traffic, because the traffic in its encrypted form will be expected to look different anyway at each hop along the route (for some security-sensitive applications, as well as eavesdroppers being unable to view the clear content of the traffic, it is also desirable that the eavesdropper cannot even tell whether the content of the traffic has been modified).

Some further exemplary implementation details will now be discussed in more detail with reference to FIGS. 2a to 4.

As mentioned previously, Internet communication is no longer limited to two endpoints exchanging messages over a dumb packet-forwarding core. Instead our data is frequently processed by intermediary middleboxes like caches, compression proxies, intrusion detection systems, or virus scanners. For example, all four major U.S. mobile carriers use HTTP proxies and a typical enterprise network has roughly as many middleboxes as it does routers and switches. As the use of encryption online increases (as of 2014, nearly half of all Web flows used HTTPS), these middleboxes become blind and can no longer perform their jobs, prompting both the academic community and industry to consider the question: how do we integrate middleboxes into secure communication sessions?

Because TLS (the standard secure communication protocol used in the Internet) is designed for exactly two parties, the current practice is to "split" the connection into two separate TLS connections: the middlebox impersonates the server to the client and opens a second connection to the server. Doing so drastically weakens security, in part because the client cannot explicitly authenticate the middlebox and also cannot be sure that the middlebox properly authenticated the server. Recently, proposals like Multi-Context TLS (mcTLS) have addressed this by allowing endpoints to explicitly authenticate one another as well as the middlebox. However, the picture is complicated by an emerging middlebox deployment model: outsourcing middlebox functionality to third party cloud providers who offer middleboxes as-a-service or to ISPs. This promises the cost benefits of economy of scale and frees network administrators from configuring and managing multiple specialized boxes. This setting poses a new challenge: the owner of middlebox software (middlebox service provider) and the owner of the hardware it runs on (infrastructure provider) are not the same. If the infrastructure is untrusted, existing protocols like "split TLS" and mcTLS cannot provide the standard security properties TLS gives us today because firstly session data and keys are visible in memory, and secondly the endpoints cannot tell if infrastructure provider actually ran the code the middlebox provider intended it to.

An existing idea is to protect session data from infrastructure providers using new cryptographic techniques. BlindBox and Embark introduce novel cryptography that allow middleboxes to directly process encrypted data. While attractive from a privacy perspective, BlindBox is (so far) too slow to deploy in practice and these solutions only support middleboxes that perform pattern-matching, like intrusion detection systems. Worse still, both BlindBox and mcTLS require both endpoints to up upgraded, which is a significant barrier to deployment. The following presents a protocol referred to herein as Middlebox TLS (mbTLS), a protocol for secure multi-party communication that addresses these shortcomings.
 (i) mbTLS protects session data from third party infrastructure providers. mbTLS leverages trusted computing technology, like Intel SGX [12, 29, 20], to isolate the middlebox execution environment from the third party infrastructure. It uses two features commonly provided by platforms like SGX: secure execution environments—the middlebox application's code, heap, and stack are encrypted and integrity-protected in memory; and remote attestation—the middlebox can cryptographically prove to the endpoint that the execution environment is configured correctly.
 (ii) mbTLS interoperates with legacy TLS endpoints. Unlike mcTLS or BlindBox, an mbTLS endpoint can securely include middleboxes in a session with an unmodified TLS endpoint. In tests, the inventors successfully loaded content from more than 300 of the top Alexa sites using an mbTLS client.
 (iii) mbTLS provides other useful security properties unique to multi-party settings. For example, mbTLS guarantees that data visits middleboxes in the order specified by the endpoints and mbTLS prevents attackers from learning whether or not a middlebox modified a piece of data before forwarding it on.

Embodiments implement mbTLS using OpenSSL and the Intel SGX SDK. mbTLS adds no handshake latency compared to TLS, and also mbTLS reduces CPU load on the middlebox and adds only reasonable overhead on the server. Further, running inside an SGX enclave does not degrade throughput. mbTLS represents a signicant and practical step toward bridging the gap between end-to-end security and the reality that middleboxes are not going away.

Most network communication sessions today involve more parties than just a client and a server. By and large, these additional parties fall into one of three categories:
 Network-Layer Middleboxes (e.g., firewall, NAT, layer 3 load balancer). These middleboxes process data packet by packet and do not need to reconstruct or access application layer data.
 Application-Layer Middleboxes (e.g., virus scanner, IDS, parental fillter, cache, compression proxy, application layer load balancer). These middleboxes do need access to application layer data.
 Application-Layer Delegates (e.g., CDNs). In contrast to middleboxes, which act as intermediaries between client and server at communication time, the term delegate is introduced herein for intermediaries that take on the role of the server during the session (though in terms of real-world relationships, they are still more naturally viewed as intermediaries). Content delivery networks (CDNs) are a good example; clients talk to CDN servers and do not directly interact with the origin server.

As security practices improve and we move toward an Internet where encryption is ubiquitous, it is becoming clear that there does not currently exist an adequate protocol for secure multi-party communication, and nor does the existing literature disclose what properties one should provide. In the two-party case, it is well understood what security properties are desired and how to achieve them—TLS has been used successfully for years. But in the multiparty case, there are still two key unanswered questions. Firstly, what security properties should hold for sessions involving three or more parties? Secondly, what are the best mechanisms to enforce those properties?

The answers to these questions may be different for each of the three categories of intermediaries. The present disclosure focuses on application-layer middleboxes, an in embodiments secure multi-party communication involving application-layer middleboxes. Even among just application-layer middleboxes, security needs are potentially diverse. For example, intrusion detection systems and compression proxies behave very differently and trust relationships differ between an administrator-mandated virus scanner and an opt-in compression service, which suggests there may not be a single one-size-fits-all solution. However, there may be at least two particular requirements that would be desirable in practice.

One is protection of session data in the case of outsourced middleboxes. There is an increasing interest in deploying middleboxes in third party environments. This may take one of at least two possible forms. First, network functions can be outsourced to a cloud provider that specializes in operating middleboxes, freeing network administrators from learning to operate specialized boxes and leveraging economy of scale to drive down costs. Second, deploying middleboxes in client ISPs can help lower latency or bandwidth costs (for example, network proxy connections using nodes in client ISPs). In both cases, the logical owner of the network function and the operator of the hardware it runs on are different. Since the middlebox infrastructure may not be trusted, it would be desirable to protect session data from the middlebox infrastructure in addition to traditional network attackers.

Another desirable requirement is legacy interoperability. Protocols like BlindBox and mcTLS require both endpoints to be upgraded. Others require that at least the client be upgraded, meaning servers cannot include middleboxes in a session with a legacy client. Realistically, however, it is not an option to wait every client in the Internet is upgraded; this is particularly true given that as many as 10% of HTTPS connections are already intercepted. Therefore, it would be desirable to support legacy endpoints.

Currently, middleboxes are sometimes inserted into encrypted connections by network administrators or by end users who run local virus/malware scanning software using the "Split TLS" approach. The middlebox (or client-side software) terminates the TLS connection, pretending to be the server, and opens a second TLS connection to the intended server.

The middlebox dynamically generates a certificate for the server's domain name and signs it with its own CA key, which is installed on the client in advance. A recent study found that nearly all popular middleboxes using this approach degrade connection security and several introduce severe vulnerabilities; most of these are due to the fact that the client cannot directly authenticate or negotiate a cipher with the server. Recent industry proposals offer more transparency, but would not still not guarantee to the client that the middlebox cannot degrade session security.

The following threat model describes a target scenario addressed by embodiments disclosed herein.
 Actors. There are six primary actors. Each is labelled herein as "trusted" or "untrusted," where trusted means that actor is authorized to access session data. Note that the last three actors are specific to multi-party communication and the last one is specific to the outsourced middlebox scenario.
 Client (C) [trusted]: The user, their machine, and the software they run (e.g., a web browser). It may be assumed that any other software running on the machine is trusted (i.e. misbehaviour by this software is out of scope).

Service Provider (S) [trusted]: The company providing the online service, its servers, and the software it runs (e.g., a web server). As with the client, for the present purposes it may be assumed that there are no attacks by other software running on the company's own servers or by malicious employees.

Third Parties (TP) [untrusted]: Anyone else with access to network traffic (or logs of such traffic), such as ISPs or coffee shop Wi-Fi snipers.

Middlebox Service (MS) [trusted]: The middlebox software that processes session data.

Middlebox Service Provider (MSP) [trusted]: The entity providing the middlebox service and any internal servers that store information related to the service.

Middlebox Infrastructure Provider (MIP) [untrusted]: The entity providing the hardware on which the middlebox software runs, such as a customer ISP or a dedicated cloud middlebox service. It may be assumed this company, its employees, its hardware, and any other software running on its machines are not trusted.

Adversary capabilities: the following assumes an active, global adversary that can observe and control any untrusted part of the system. In the network, the adversary can observe, modify, or drop any packet and inject new ones. On the middlebox infrastructure, the adversary has complete access to all hardware (e.g., it can read and manipulate memory) and software (e.g., it can execute arbitrary code, including privileged code like a malicious OS). This includes the ability to modify or replace middlebox code sent by the MSP to executed by the MIP. However, it is assumed the adversary is computationally bounded (i.e., cannot break standard cryptographic primitives) and cannot compromise trusted computing hardware (e.g. Intel SGX-enabled CPUs). Side channel attacks (e.g. based on traffic or cache access patterns), exploitable flaws in middlebox software, and denial of service are out of scope.

Security properties: "secure" multi-party communication with application-layer middleboxes may be defined by the following four properties P1 to P4.

P1: Data secrecy. P1A: The adversary must not be able to read session data. P1B: Communication should be forward secret (the compromise of a long-term private key does not help an attacker access previous sessions' data). P1C: The adversary should learn nothing more from observing ciphertext than it would if each hop were its own, independent TLS connection (e.g., the adversary should not learn whether or not a middlebox modified data before forwarding it).

P2: Data authentication. The adversary should not be able to modify, delete, or inject session data. This includes replaying or re-ordering data.

P3: Entity authentication. Endpoints must be able to verify they are talking to the "right thing." This encompasses two subtly intertwined properties. P3A: Each endpoint can verify that the other endpoint is operated by the expected entity and that each MS is operated by the expected MSP (e.g., a server of a video sharing service). P3B: Each endpoint can verify that the other endpoint and each MS is running the expected software and that it is correctly configured (e.g., Apache v2.4.25 with only strong TLS cipher suites enabled).

P4: Path integrity. The endpoints fix an ordered path of middleboxes for a session. It must not be possible for any other entity (including a middlebox) to cause session data to be processed by middleboxes in a different order (including skipping a middlebox).

Note that the first three properties are the same properties TLS provides for two-party communication, but extended to a multi-party setting; the fourth, path integrity, arises only when three or more parties are present (path order can impact security, especially when middleboxes perform filtering and/or sanitization functions).

Since TLS already provides many of the properties that are desired, one approach is the following: establish a regular TLS session between the client and the server, then pass the session keys to the middleboxes over separate, secondary TLS sessions. This is illustrated in FIG. 2a. This provides many of the security properties that are desired: data is encrypted and integrity-protected against changes from third parties, the communication is forward secret if a forward secure cipher suite is used, and the endpoints can verify one another's identify using certificates.

However, using TLS in this way is a less preferred embodiment according to the above threat model, for three reasons: (I) since it is designed for two parties, it has no mechanism to provide path integrity (P4); (II) the same key is used for encryption on each hop in the session, making it simple for adversaries to compare records entering and leaving a middlebox to see if they changed (P1C); and (III) the infrastructure provider can access session data in memory (P1A), access key material in memory and use it to forge MACs (P2), and potentially run software other than what was provided by the MSP (P3B).

In embodiments, these issues are addressed by making two further high-level changes to the approach of FIG. 2a. This is shown in FIG. 2b, where unique keys are generated for each hop, and middleboxes are run in secure execution environments. The result may be referred to herein as Middlebox TLS (mbTLS). First, the handshake is modified to assign unique symmetric keys to each hop in the session. This prevents adversaries from delivering records to an out-of-sequence middlebox and makes it impossible to tell when a middlebox forwards data without changing it. Second, if protection from the infrastructure is needed, middleboxes can be run in a secure execution environment, like an Intel SGX enclave, to protect session data and keys from an untrusted MIP.

A note regarding trusted computing and SGXL: some features of mbTLS employ trusted computing technology, like Intel's Software Guard Extensions (SGX). In particular, mbTLS uses two features provided by SGX: secure execution environments and remote attestation. In alternative implementations, any trusted computing technology that offers these features, like Microsoft's Virtual Secure Mode (VSM) or ARM TrustZone would work as well. (Other technologies, like ARM TrustZone, offerer similar functionality, but provide slightly different security guarantees.)

Secure execution Environment: SGX allows applications to run code inside a secure environment called an enclave. An enclave is a region of protected memory containing program code and data; before cache lines are moved to DRAM, they are encrypted and integrity-protected by the CPU. As long as the CPU has not been physically compromised, even malicious hardware or privileged software cannot access or modify enclave memory. Running code in an enclave incurs a performance penalty because (a) cache lines written to/read from memory must first be encrypted/ decrypted and (b) since the OS is untrusted, enclave threads must leave the enclave in order to make system calls, like send( ) and recv( ).

Remote attestation: SGX can provide code running in an enclave with a special message, signed by the CPU, called an attestation, that proves to remote parties that the code in question is indeed running in an enclave on a genuine Intel CPU. The attestation includes a cryptographic hash of initial state of the enclave code and data pages (so the remote verifier can see that the expected code is running) as well as custom data provided by the enclave application (we use this to integrate attestation with the TLS handshake).

The following presents example implementation details of Middlebox TLS, or mbTLS, a protocol for secure multi-party communication that lets endpoints establish a secure communication session that includes application-layer middleboxes. Each endpoint 102, 104 adds zero or more middleboxes to a session, which may be referred to as client-side and server-side middleboxes (108-C and 108-S in the figures). Each endpoint has no knowledge of the other's middleboxes (or if it has any at all). Importantly, this means a mbTLS endpoint can inter-operate with legacy TLS endpoints.

At a high level, the endpoints do a standard TLS handshake, establishing a primary TLS session, which will eventually be used for data transfer. The endpoints simultaneously establish a secondary TLS session with each of their middleboxes. Once an endpoint has a secure channel to a middlebox, it sends the middlebox the key material it needs to join the primary end-to-end session. In embodiments, the presently disclosed protocol extends the TLS 1.2 handshake 2 to optionally include a remote attestation, which the endpoints may use here to verify that these secondary TLS sessions terminate inside a secure execution environment. In embodiments this is the only change made to the TLS 1.2 handshakes used as building blocks for the mbTLS handshake.

At the end of a mbTLS handshake, the session looks like FIG. 3. This example session shows two client-side and two server-side middleboxes. Each hop encrypts and MAC-protects data with a different key—The client generates keys for the client-side hops, the server generates keys for the server-side hops, and the primary session key bridges the sides. As each hop has its own key for encryption/MAC, this prevents an adversary from causing records to skip a middlebox or traverse the middleboxes in the wrong order and also prevents eavesdroppers from detecting whether or not a middlebox modified a record. Apart from this, the record layer is unchanged from standard TLS. Each endpoint generates the keys for its half of the connection (e.g., the client generates KC-C1 and KC1-C0 in the figure). The session key established as a result of the primary handshake, KC-S, serves as a "bridge" between the client-side and server-side middleboxes.

In embodiments messaging according to the mbTLS protocol may work as follows. Reference is also made to FIG. 4. mbTLS uses the same per-hop TCP connections for the primary and secondary handshakes. We introduce a new TLS record type (Encapsulated) to wrap secondary TLS records between a middlebox and its endpoint. These records consist of an outer TLS record header followed by a one byte subchannel ID and the encapsulated record. For details on mbTLS message formats.

With regard to client-Side Middleboxes, mbTLS allows clients to include both middleboxes known a priori (e.g., configured by a user or announced via DNS, DHCP, or PDP/PDN) and those discovered during session establishment (on the default routing path). To inform on-path middleboxes that the client supports mbTLS, the primary ClientHello includes a new MiddleboxSupport TLS extension. When it sees the extension, the middlebox forwards the ClientHello onward toward the server, and begins its own secondary handshake with the client. In this secondary handshake, the middlebox plays the role of the server. The original, primary ClientHello serves double-duty as the ClientHello for the secondary handshake as well; the middlebox responds directly with a ServerHello3 (This is to avoid an extra round trip.) Though in all computations, both the client and the middlebox use PRF(ClientRandom||MiddleboxRandom).

There may be multiple client-side middleboxes. Secondary handshake messages are sent in Encapsulated records, each middlebox with its own subchannel ID. Middleboxes wait until they see the primary ServerHello, buffer it, assign themselves the next available subchannel ID, inject their own secondary ServerHello into the data stream using that ID, and finally forward the primary ServerHello. This process ensures that each middlebox gets a unique subchannel ID with minimal coordination.

With regard to server-side middleboxes, these can also be pre-arranged (e.g., via DNS) or discovered on the fly. Discovery is slightly more involved in the server-side case, however. Unlike the client, the server does not announce mbTLS support using the MiddleboxSupport extension for two reasons: first, the TLS spec forbids the server from including an extension in the ServerHello that the client did not include in the ClientHello; relying on a MiddleboxSupport extension for the server would fail if the client does not also support mbTLS. Second, even if this were possible, if server-side middleboxes waited to announce their presence until after the server's ServerHello, the middlebox-server handshake would finish after the primary handshake, lengthening the overall handshake process to more than two RTTs.

Instead, server-side middleboxes optimistically announce themselves with a new MiddleboxAnnouncement message before they know if the server supports mbTLS. If it does not, then depending on its TLS implementation, it will either ignore the MiddleboxAnnouncement and the handshake will proceed without the middlebox, or the handshake will fail. (In either case, the middlebox will cache this information and not announce itself to this server again.) If the handshake fails, the client will need to retry. There is a potential danger that client software might interpret this to mean the server is running an out-of-date TLS stack and retry using an older version of TLS. Furthermore, in practice, it is expected that server-side middleboxes and servers will typically be under the same administrative control, in which case the middleboxes know that the server supports mbTLS. Like the client-side middleboxes, server-side middleboxes assign themselves unused subchannel IDs when they send their MiddleboxAnnouncement messages.

With regard to attestation, when endpoints handshake with their middleboxes, they can choose to require a certificate, an SGX attestation, or both. Certificate verification works just as it would in a normal TLS handshake, so the following focuses just on attestation. The goal is to convince the endpoint that only the middlebox application running in the enclave knows the TLS session key being established. The main idea of this is the following: since the attestation includes the identity of the code, and we assume the code (application+mbTLS library) has been inspected and is trusted, then if the code tells us that it generated the secret key material for this handshake and did not export it, then we can trust it. The challenge becomes identifying "this handshake"—how can the endpoint be sure an adversary is not replaying an old attestation from a different handshake?

This means, in addition to the code identity, the attestation should include some kind of handshake identifier (SGX allows attestations to include 64 bytes of arbitrary user data). A good handshake identifier should be something that (A) is present in every handshake (so, not the session ID, which the server can choose not to support), (B) will not normally repeat in future handshakes, and (C) cannot be forced to repeat by an attacker (so, not the client random). Good candidates include anything based on the ephemeral keys exchanged in the handshake. The pre-master secret, or anything derived from it, would be a good choice, except this is only known to the middlebox after receiving the ClientKeyExchange from the endpoint. If it is waited this long to send the attestation, this delays the overall end-to-end handshake. Instead, the handshake identifier may be based on just the middlebox's key material (one implementation uses a hash of the middlebox's public ephemeral Diffie Hellman key). It is okay that these are public because they do not repeat normally and an attacker cannot force them to. This requires that the server use a key exchange method with an ephemeral public key (since a fixed public key will be the same in each handshake), but using ephemeral keys for forward secrecy is standard best practice anyway.

With regard to key distribution, after finishing the secondary handshakes with its middleboxes, each endpoint generates a symmetric key for each hop on its side of the connection. It distributes these keys to its middleboxes in encrypted MiddleboxKeyExchange records, which, just like the secondary handshake messages, are sent in Encapsulated records in the data stream. The client-server session key (KC-S) acts as a "bridge" between the last client-side middlebox and the first server-side middlebox.

The following now revisits each security property P1-P4, showing why mbTLS addresses these.

P1: Data Secrecy. P1A: The adversary must not be able to read session data. Decrypting session data requires access to one of the symmetric keys shown in FIG. 3. The bridge key, KC-S, is established during the end-to-end client-server TLS handshake in which the endpoints verify one another's certificates. Next, this key and the rest of the session keys (e.g., KC-C1, KC1-C0, etc.) are transferred to the middleboxes over individual secondary TLS connections; importantly, these secondary connections terminate inside the SGX enclave, meaning the MIP cannot access the secondary session's key in memory, so only the MS (and not the MIP) learns the primary session keys. Remote attestation proves to a middlebox's endpoint that the MS is truly running in the secure environment.

P1B: Communication should be forward secret. The bridge key (KC-S) is the result of the (standard) primary TLS handshake, so if the primary handshake is forward secure, so is KC-S. The other session keys (e.g., KC-C0, KC0-C1, etc.) are generated fresh for each session and sent to the middleboxes over (standard) secondary TLS connections. Therefore, if these secondary handshakes are forward secure, so are the non-bridge session keys.

P1C: The adversary should learn nothing more from observing ciphertext than it would if each hop were its own, independent TLS connection. Since each hop uses its own independent encryption and MAC keys, after the handshake each hop effectively operates like its own TLS connection. In particular, this prevents an adversary from learning whether or not a middlebox modified a record (though it can still see the sizes and timings of each record, including whether a middlebox increased or decreased the size of the data).

P2: Data Authentication. The adversary must not be able to modify, delete, or inject session data. Each record carries a message authentication code (MAC), a small tag generated using the session key that identifies a piece of data. Unauthorized changes can be detected if the MAC does not match the data. Since only the endpoints and each MS know the session keys (see P1A), only these entities can modify or create records.

P3: Entity Authentication. P3A: Each endpoint can verify that the other endpoint is operated by the expected entity and that each MS is operated by the expected MSP. First, the client and server can require one another's certificate in the primary handshake (though typically client authentication happens at the application layer). A certificate binds the server's public key to its identity, and that public key is used in the primary handshake to negotiate the shared bridge key, so after a successful handshake, the client is assured that any data encrypted with that bridge key can only be decrypted by the expected service provider (or middleboxes it chose to add to the session). Second, endpoints can also require certificates from middleboxes. Since the private key corresponding to the certificate is stored in the enclave, inaccessible by the MIP (and remote attestation proves that this is the case), the endpoint is convinced it is talking to software supplied and configured by the expected MSP.

P3B: Each endpoint can verify that the other endpoint and each MS is running the expected software and that it is correctly configured. Since our threat model assumes that the SP and all software running on its server is trusted, and in P3A we verified that the server possesses the SP's private key, the client trusts that the machine is properly configured with the expected application software. The same logic applies to the middleboxes, with the additional step that the remote attestation convinces the endpoint that the MS is safely isolated in the secure execution environment.

P4: Path Integrity. Each endpoint picks an order for its middleboxes. It must not be possible for any other entity (including the other endpoint or any middlebox) to cause session data to be processed by middleboxes in a different order. This follows from the fact that mbTLS uses a fresh key for each hop. Suppose an adversary snipes a record from the C1-C0 link in FIG. 3 and tries to insert it on the S0-S1 link (thereby skipping middleboxes C0 and S0). The record will be encrypted and MAC'd with KC1-C0, but C1 expects data secured with KS1-S0, so the MAC check will fail and the record will be discarded. (Note, that an endpoint can inject, delete, or modify data anywhere in its portion of the path because it knows all the session keys on its side.)

Some further security properties of the exemplary mbTLS protocol, in embodiments, are as follows.

Endpoint isolation: endpoints can only authenticate their own middleboxes, not those added by the other endpoint. In fact, an endpoint likely does not even know about the other side's middleboxes. This follows from the way keys are generated and distributed. Checking a certificate or an attestation is only meaningful if the public key in the certificate is used for key exchange (then you trust that only the entity associated with that public key can decrypt what you send with the new symmetric key). Since endpoints don't do a KE with the other side's middleboxes, they have no means of authenticating one another, even if they exchanged certificates/attestations. This limitation is reasonable; since the endpoints presumably trust one another or they would not be communicating to begin with, it is natural to trust the other endpoint to properly authenticate any middleboxes it adds to the session.

Path flexibility: It is not possible to interleave client-side and server-side middleboxes. To support this, the endpoints would need to coordinate to generate/distribute keys to the interleaved portion of the path. This means extra work for endpoints, and also that the endpoints would need to know about (some of) one another's middleboxes. This would also mean that one endpoint could modify/inject traffic after the other endpoint's middleboxes, which could be a security issue if one of those middleboxes does some kind of filtering or sanitization.

Untrusted MSPs: mbTLS can provide guarantees even with the service provider is untrusted. In our threat model, both the SP and the MSPs are trusted. However, even in a more pessimistic threat model where they are untrusted, remote attestation can still provide P1, P2, P3, and P4, since the attestation identifies the code running in the secure environment. This relies on two big assumptions: One, that software is known to "behave well" (e.g., does not export session data outside the enclave); and Two, that the client knows a hash of this "known good" software. For example, a client could connect to an untrusted Web proxy if the software is open source and has been publicly verified to keep session data confidential, even if the client trusts neither the company operating the service nor the infrastructure it runs on.

Middlebox State Poisoning: It is not safe to use mbTLS with client-side middleboxes that keep global state. Since endpoints know the keys for each hop on their side of the connection, a malicious client can read and/or modify data on any of these hops without its middleboxes knowing. This is a problem when a middlebox that shares state across multiple clients, like a Web cache. A client with access to a link between the cache and the server could request a page, drop the server's response, and inject its own response, thereby poisoning the cache for other clients. One possible solution is to alter the handshake protocol so that middleboxes establish keys with their neighbours rather than endpoints generating and distributing session keys; this means each party only knows the key(s) for the hop(s) adjacent to it. The downside is the client has lost the ability to verify the server's certificate and establish a session key using the public key in that certificate. Instead, the client must trust its middleboxes to authenticate the server. This may be reasonable, since the SGX attestation should convince the client that the middlebox is running software that will do so, but embodiments do not take this approach in mbTLS because, where possible, it may be preferred to rely on cryptography, since relying on SGX also means relying on the correctness of the protocol library code.

Bypassing filter middleboxes: At first glance it appears that the fact endpoints know all the session keys on their side opens another attack: if a middlebox performs some kind of filltering function (e.g., a virus scanner, parental filter, or data exfiltration detector mandated by an administrator), this means the endpoint has the keys to access incoming data before it is filtered or inject outbound data afterward. However, if an endpoint is capable of reading or writing data "on the other side of" of the filter (i.e., physically retrieve/inject packets from/into the network beyond the middlebox), then the filter was useless to begin with, so mbTLS does not enable new attacks.

Some further features of exemplary embodiments of mbTLS are now discussed.

Session resumption: in embodiments mbTLS fully supports both ID-based and ticket-based session resumption. Each sub-handshake (the primary handshake and the secondary handshakes) simply does a standard abbreviated handshake; the only minor difference is that the session-tickets for middleboxes should contain the session keys for the end-to-end session (in addition to the key for the endpoint-middlebox sub-session). A new attestation is not required, because only the enclave knows the key needed to decrypt the session ticket. A client that wishes to resume a session stores a session ID or ticket for the server and each client-side middlebox. If the server also uses mbTLS, it can either cache the session IDs/tickets for its middleboxes or ask the client cache them and send them in its ClientHello.

TLS 1.3: This significantly changes the TLS handshake compared to TLS 1.2 and earlier, shortening it from two round trips to just one. With minor modifications, mbTLS's handshake can be adapted to TLS 1.3. There is one caveat: when client-side middleboxes are present, data sent by the server in the same flight as the server Finished could be delayed, in the worst case, up to one round trip. In most cases, however, clients send application data first; in these cases, there is no issue.

mbTLS and SGX: the latter poses restrictions middlebox developers. Since only the CPU is trusted, interaction with the outside world is not permitted by default (notably, system calls are not permitted, since the OS is untrusted). Intel's SDK implements a subset of libc, but the remaining functionality must be added by the developer by either providing a custom implementation inside the enclave or developing an explicit enclave interface for enclave threads to leave the enclave, execute untrusted code, and return to the enclave with the result.

There are different approaches, which balance two competing factors: the size of the Trusted Computing Base, i.e., TCB, (the more code inside the enclave, the more likely it contains an exploitable bug) and the size of the enclave interface (each call outside the enclave is an opportunity for an attacker to inject malicious input). One extreme is to place an entire library OS inside the enclave, resulting in a large TCB but a small enclave interface. The opposite extreme is implement nothing in the enclave and step outside for each libc call (small TCB, large interface). It is also possible to take a middle ground.

Network I/O: When an enclave thread needs to make a system call, there are two high-level strategies: (1) it copies the arguments into unprotected memory, exits the enclave, executes the call, re-enters the enclave, and copies the result back into enclave memory; or (2) it places a request in a shared queue and another thread outside the enclave executes the call passes the result back into the enclave via a response queue. These are synchronous and asynchronous system calls, respectively.

It will be appreciated that the above embodiments have been described by way of example only.

More generally, according one aspect disclosed herein there is provided a method of communicating over a network between a first endpoint and a second endpoint, the first endpoint being a client device or a server and the second endpoint being the other of the client device and server; the method comprising: establishing a first secure transport layer channel between the first and second endpoints, the first secure transport layer channel being defined by a first cryptographic key required to access content of traffic sent over the first secure transport layer channel; establishing a second secure transport layer channel between the first endpoint and a middlebox to which the first endpoint is to delegate processing of the traffic sent over the first secure transport layer channel, the second secure transport layer channel being defined by a second cryptographic key required to access content sent over the second secure transport layer channel; the first endpoint validating the middlebox via the respective second secure transport layer channel, and on condition of said validation sharing the first encryption key with the middlebox via the second secure transport layer channel; and causing the traffic sent over the channel to be routed via the middlebox; the method thereby enabling the middlebox to process, in the clear, content of the traffic sent over the first secure transport layer channel using the first cryptographic key.

In embodiments, each of the first and second transport layer channels may be a TLS channel.

In embodiments, said validation may comprise confirming that the middlebox is provided by an intended party.

In embodiments, said validation may comprise authenticating that the middlebox is provided by trusted party.

In embodiments, said validation may comprise confirming that the middlebox provides an intended service.

In embodiments, the middlebox may comprise at least one of: a virus scanner, a child safety filter, an intrusion detector, a compression proxy, audio or video transcoder, an HTTP proxy, an application-layer load balancer, and/or a cache.

In embodiments, the traffic may be caused to be routed via the middlebox by suppling the second endpoint with an IP address or domain name of the middlebox as a contact address of the first, or by configuring the network to redirect traffic addressed to the first endpoint to the middlebox.

In embodiments, the method may comprise said client and at least one further client communicating with the server via said first secure transport layer channel as part of a same multiparty communication session.

In embodiments the middlebox may run within a secure enclave of the network equipment upon which the middlebox is implemented.

In embodiments, the first endpoint may be the client and the second endpoint may be the server.

In embodiments, the establishment of the first secure transport layer channel may comprise the client sending a message to the server via the middlebox, wherein the message may comprise a TLS Extension configured to cause the middlebox to begin a handshake with the client to perform said establishing of the second secure transport layer channel.

In alternative embodiments, the first endpoint may be the server and the second endpoint may be the client.

In embodiments, the method may comprise: for each respective one of the first and second endpoints, establishing a different respective second secure transport layer channel between the respective endpoint and a respective middlebox to which the respective endpoint is to delegate processing of the traffic sent over the first secure transport layer channel, each second secure transport layer channel being defined by a different respective second cryptographic key required to access content sent over the respective second secure transport layer channel; each of the first and second endpoints validating its respective middlebox via the respective second secure transport layer channel, and on condition of said validation sharing the first encryption key with the respective middlebox via the respective second secure transport layer channel; and causing the traffic sent over the channel to be routed via the middleboxes of both the first and second endpoints; the method thereby enabling the middleboxes of both endpoints to process content of the traffic sent over the first channel using the first cryptographic key.

In embodiments, a chain of multiple middleboxes may be included in the first secure transport layer channel, each introduced using a different respective second secure transport layer channel according to a respective instance of said method.

In embodiments, said chain may comprise multiple middleboxes of the first endpoint, each introduced using a different respective second secure transport layer channel according to a respective instance of said method.

In embodiments, wherein said chain may comprise multiple middleboxes of the second endpoint, each introduced using a different respective second secure transport layer channel according to a respective instance of said method.

In embodiments, the method may comprise enforcing an order in which the middleboxes receive the traffic by: sending the traffic using a different respective per-hop encryption key to encrypt the traffic over each hop between endpoint and middlebox and each hop between middleboxes.

In embodiments, said network may comprise the Internet.

According to another aspect disclosed herein, there is provided a computer program product embodied on computer readable storage and configured so as when run on a computer system to perform the method of any of the above embodiments.

According to another aspect disclosed herein, there is provided a computer system comprising at least the first endpoint programmed to perform the method of any preceding embodiment.

Other variants may become apparent to a person skilled in the art once given the disclosure herein. The scope of the present disclosure is not limited by the above-described embodiments but only by the accompanying claims.

The invention claimed is:

1. A method of communicating over a network between a first endpoint and a second endpoint, the first endpoint being a client device or a server and the second endpoint being the other of the client device and server, the method comprising:
  establishing a first secure transport layer channel between the first and second endpoints, the first secure transport layer channel being defined by a first cryptographic key required to access content of traffic sent over the first secure transport layer channel;
  establishing a second secure transport layer channel between the first endpoint and a first middlebox to which the first endpoint is to delegate processing of the traffic sent over the first secure transport layer channel, the second secure transport layer channel being defined by a second cryptographic key required to access content sent over the second secure transport layer channel;
  the first endpoint validating the first middlebox via the respective second secure transport layer channel, and on condition of said validation, sharing the first cryptographic key with the first middlebox via the second secure transport layer channel;
  causing the traffic sent over the second secure transport layer channel to be routed via the first middlebox of the first endpoint and a second middlebox associated with the second endpoint;
  the method thereby enabling the first middlebox to process, in the clear, content of the traffic sent over the first secure transport layer channel using the first cryptographic key.

2. The method of claim 1, wherein each of the first and second transport layer channels is a TLS channel.

3. The method of claim 1, wherein said validation comprises confirming that the first middlebox is provided by an intended party.

4. The method of claim 1, wherein said validation comprises authenticating that the first middlebox is provided by trusted party.

5. The method of claim 1, wherein said validation comprises confirming that the first middlebox provides an intended service.

6. The method of claim 1, wherein the first middlebox comprises one of:
- a virus scanner,
- a child safety filter,
- an intrusion detector,
- a compression proxy,
- audio or video transcoder,
- an HTTP proxy,
- an application-layer load balancer, and/or
- a cache.

7. The method of claim 1, wherein the traffic is caused to be routed via the first middlebox by suppling the second endpoint with an IP address or domain name of the first middlebox as a contact address of the first endpoint, or by configuring the network to redirect traffic addressed to the first endpoint to the first middlebox.

8. The method of claim 1, comprising said client and at least one further client communicating with the server via said first secure transport layer channel as part of a same multiparty communication session.

9. The method of claim 1, wherein the first middlebox runs within a secure enclave of the network equipment upon which the first middlebox is implemented.

10. The method of claim 1, wherein the first endpoint is the client and the second endpoint is the server.

11. The method of claim 10, wherein the establishment of the first secure transport layer channel comprises the client sending a message to the server via the first middlebox, and wherein the message comprises a TLS Extension configured to cause the first middlebox to begin a handshake with the client to perform said establishing of the second secure transport layer channel.

12. The method of claim 1, wherein the first endpoint is the server and the second endpoint is the client.

13. The method of claim 1, comprising:
for each respective one of the first and second endpoints, establishing a different respective second secure transport layer channel between the respective endpoint and a respective middlebox to which the respective endpoint is to delegate processing of the traffic sent over the first secure transport layer channel, each second secure transport layer channel being defined by a different respective second cryptographic key required to access content sent over the respective second secure transport layer channel; and
each of the first and second endpoints validating its respective middlebox via the respective second secure transport layer channel, and on condition of said validation sharing the first encryption key with the respective middlebox via the respective second secure transport layer channel; and
the method thereby enabling the middleboxes of both endpoints to process content of the traffic sent over the first channel using the first cryptographic key.

14. The method of claim 1, wherein a chain of multiple middleboxes are included in the first secure transport layer channel, each introduced using a different respective second secure transport layer channel according to a respective instance of said method.

15. The method of claim 14, wherein said chain comprises multiple middleboxes of the first endpoint, each introduced using a different respective second secure transport layer channel according to a respective instance of the method of any of claims 1 to 12.

16. The method of claim 14, wherein said chain comprises additional middleboxes of the second endpoint, each introduced using a different respective second secure transport layer channel according to a respective instance of the method of claim 13.

17. The method of claim 14, comprising enforcing an order in which the middleboxes receive the traffic by:
sending the traffic using a different respective per-hop encryption key to encrypt the traffic over each hop between endpoint and middlebox and each hop between middleboxes.

18. The method of claim 1, wherein said network comprises the Internet.

19. A computer program product embodied on computer readable storage device and executable by one or more processors to perform operations comprising:
establishing a first secure transport layer channel between the first and second endpoints, the first secure transport layer channel being defined by a first cryptographic key required to access content of traffic sent over the first secure transport layer channel;
establishing a second secure transport layer channel between the first endpoint and a first middlebox to which the first endpoint is to delegate processing of the traffic sent over the first secure transport layer channel, the second secure transport layer channel being defined by a second cryptographic key required to access content sent over the second secure transport layer channel;
the first endpoint validating the first middlebox via the respective second secure transport layer channel, and on condition of said validation, sharing the first key with the first middlebox via the second secure transport layer channel; and
causing the traffic sent over the second secure transport layer channel to be routed via the first middlebox of the first endpoint and a second middlebox associated with the second endpoint;
the method thereby enabling the first middlebox to process, in the clear, content of the traffic sent over the first secure transport layer channel using the first cryptographic key.

20. A computer system comprising at least the first endpoint programmed to perform operations comprising:
establishing a first secure transport layer channel between the first and second endpoints, the first secure transport layer channel being defined by a first cryptographic key required to access content of traffic sent over the first secure transport layer channel;
establishing a second secure transport layer channel between the first endpoint and a first middlebox to which the first endpoint is to delegate processing of the traffic sent over the first secure transport layer channel, the second secure transport layer channel being defined by a second cryptographic key required to access content sent over the second secure transport layer channel;
the first endpoint validating the first middlebox via the respective second secure transport layer channel, and on condition of said validation, sharing the first key with the first middlebox via the second secure transport layer channel; and causing the traffic sent over the second secure transport layer channel to be routed via the first middlebox of the first endpoint and a second middlebox associated with the second endpoint;

the method thereby enabling the first middlebox to process, in the clear, content of the traffic sent over the first secure transport layer channel using the first cryptographic key.

* * * * *